United States Patent
Rizvi

(10) Patent No.: US 11,692,802 B2
(45) Date of Patent: Jul. 4, 2023

(54) TAPE DISPENSER FOR DEFINING A PERIMETER, APPARATUS THEREFROM AND METHODS THEREFOR

(71) Applicant: Shamak LLC, Lewes, DE (US)

(72) Inventor: Farhad Qamar Rizvi, Frisco, TX (US)

( * ) Notice: Subject to any disclaimer, the term of this patent is extended or adjusted under 35 U.S.C. 154(b) by 100 days.

(21) Appl. No.: 17/336,300

(22) Filed: Jun. 1, 2021

(65) Prior Publication Data
US 2022/0120549 A1    Apr. 21, 2022

Related U.S. Application Data

(60) Provisional application No. 63/093,793, filed on Oct. 20, 2020.

(51) Int. Cl.
| | |
|---|---|
| G01B 3/1048 | (2020.01) |
| G01B 3/1007 | (2020.01) |
| G01B 3/1071 | (2020.01) |
| G01B 3/1089 | (2020.01) |
| G01B 3/1043 | (2020.01) |

(52) U.S. Cl.
CPC ......... *G01B 3/1048* (2020.01); *G01B 3/1007* (2020.01); *G01B 3/1043* (2020.01); *G01B 3/1071* (2013.01); *G01B 3/1089* (2020.01); *G01B 2003/1074* (2013.01)

(58) Field of Classification Search
USPC ............................ 33/770, 1 G, 755; 473/490
See application file for complete search history.

(56) References Cited

U.S. PATENT DOCUMENTS

| | | | | |
|---|---|---|---|---|
| 3,668,781 | A * | 6/1972 | Teter ...................... | A63C 19/08 33/1 H |
| 4,160,324 | A * | 7/1979 | Dunn ..................... | A63C 19/06 33/759 |
| 5,253,421 | A * | 10/1993 | Landmark ................. | B43L 9/04 33/760 |
| 5,371,949 | A * | 12/1994 | Delaurier ............. | A63C 19/065 33/1 G |
| 5,427,383 | A * | 6/1995 | Viens ..................... | A63C 19/06 33/759 |
| 6,893,365 | B2 * | 5/2005 | Rathbun ............ | A63B 69/0002 33/1 G |
| 6,951,061 | B1 * | 10/2005 | Rosetti ................. | G01B 3/1071 33/760 |
| 7,062,859 | B1 * | 6/2006 | Revnell ................... | B43L 13/20 33/430 |

(Continued)

*Primary Examiner* — Christopher W Fulton
(74) *Attorney, Agent, or Firm* — Lloyd & Mousilii PLLC; Jeoyuh Lin

(57) ABSTRACT

A tape dispenser that includes a gripper pad and a tape reel. The tape reel includes a spool around which a tape is wound. The spool is enclosed in a housing that includes an opening through which a free end of the tape is allowed to pass through. The free end of the tape includes a fastener such as a hook. The housing also includes a tape lock and a roller handle. The gripper pad includes at least one suction pad, receiving means for a stake, or both. The tape reel and the gripper pad each include receiving means for a connecting means. The connecting means is a wedge connector, a magnetic connector, or the like, and combinations thereof. The tape reel is allowed to freely rotate while the gripper pad remains affixed onto a surface such as a floor, a lawn or a turf.

19 Claims, 8 Drawing Sheets

(56) References Cited

U.S. PATENT DOCUMENTS

| | | | |
|---|---|---|---|
| 7,870,679 B2* | 1/2011 | Lee | G01B 3/10 33/770 |
| 8,966,774 B2* | 3/2015 | Choi | G01C 15/04 33/1 G |
| 11,029,136 B2* | 6/2021 | Richey | G01B 3/1071 |
| 2006/0010705 A1* | 1/2006 | Dettellis | G01B 3/11 33/756 |
| 2015/0107128 A1* | 4/2015 | Kar Ho Samuel | G01B 3/1041 33/758 |

* cited by examiner

TAPE DISPENSER FOR DEFINING A PERIMETER, APPARATUS THEREFROM AND METHODS THEREFOR

CROSS-REFERENCE TO RELATED APPLICATION

This application claims priority to, and the benefit of, U.S. Provisional Application Ser. No. 63/093,793, filed on Oct. 20, 2020, the entire disclosure of which is hereby incorporated by reference.

TECHNICAL FIELD

The disclosure relates generally to a tape dispenser useful to define a perimeter, and more specifically a tape dispenser including a gripper pad and a tape reel that includes a retractable tape.

BACKGROUND

Many sporting activities involve the use of a section on which a large part of the action of the sport occurs. This section is typically demarcated using perimeters. Also, very often, other personnel associated with the sport, such as coaches, medical staff, bench players, and the like are present just outside these lines but within close range as they are integral part of the sporting activity. To ensure the active players and non-playing personnel are separated, the perimeters are defined using clearly marked lines. The perimeters also play an important role in determining outcome of certain events in different sporting activities. For example, in basketball and soccer, the ball must stay within the boundaries of the court or field. If the ball crosses outside the court or field, control of the ball is turned over to the team, which was not the last team to touch the ball. In other sports such as tennis or volleyball, the server must strike the ball from behind the back boundary. Further, in badminton, tennis or volleyball, a team earns a point based on whether the ball touches the ground inside or outside the boundary in conjunction with which team last touched the ball.

Most instances of sporting activities are undertaken by a small group of people, generally friends and acquaintances, in a location that is not specially designed for that sporting activity. For instance, a group of six friends gather in a beach wherein one of them brings a volleyball, net and poles to erect a net. The space is demarcated by the drawing of lines on the sand. However, these lines get erased during the course of play. Similarly, a smaller group of people might gather together in a park for a game of soccer, wherein the perimeter for the soccer field is generally not readily available. Also, during practice sessions, coaches divide the entire soccer squad to practice groups and practice in smaller sections of the soccer field. In all these cases, makeshift boundaries are established based on visual markers (such as a bush or a tree) that can get confusing to establish if the ball was in or out. This kind of informal play can lead to tension between the players such as when a dispute occurs as to whether a ball was in or out.

Additionally, traditional methods of demarcating perimeters are based on rough estimations of dimensions, and are generally inaccurate as measurement devices are independent to these and not something generally readily available with players.

Plastic sports cones are also often used to define boundaries, but often times they are not set up in a straight line. Also, during active play, they are frequently stepped on and moved. These cones also suffer from the same inability of providing accurate dimensions to playing fields.

Some sports kits have a built in boundary system, but these are useful for that particular sport, and is not adaptable for fewer players or more definitely, for other sports. For example, a soccer kit may have some way of setting up a perimeter for a soccer field, however it can't be used to setup a volleyball or basketball court. Further, the dimensions will be preset for a certain number of players, and cannot be extended or reduced to account for player variations. Hence, these systems are useful for professional players and teams, but they are not conducive for use by recreational players, as it requires purchasing multiple setups for different sports. This would prove an expensive proposition for the recreational player. Also, storage of such setups would also cause problems as such multiple setups require considerable amount of space.

Setting up of perimeter is not only useful in sporting activities but in other facets as well. For example, during construction, demarcating a particular region for a certain purpose, such as the location for a future construction of a pool or a kitchen island in a house, would often be required. These regions are generally of very unique and specific dimensions.

Currently, there is no tool in the home improvement/tools/sports equipment space that enables one to put a marker on the ground that dispenses measuring tape without moving from its spot and also allows one to connect to other points to measure an area. Additionally, there is no measuring tool that allows someone to measure in different directions from a single location without moving the base.

SUMMARY

In an embodiment a tape dispenser is provided, the tape dispenser including a gripper pad; a tape reel; and a connecting means to connect the gripper pad and the tape reel. The tape reel includes a spool around which a tape is wound on the tape's fixed end while the free end is allowed to extend outward through an opening on a housing encasing the spool. The tape includes a fastener on its free end, and the housing including a fastener receptacle. Further, the tape includes distance measurements in suitable measurement units printed on the tape, which facilitate setting up perimeters with precise lengths along any direction.

In another embodiment, an apparatus for setting up a perimeter is provided. The apparatus that includes a plurality of tape dispensers, wherein each tape dispenser is located such that it defines a corner of the perimeter.

In yet another a method of setting up a perimeter using the apparatus described herein is provided.

DRAWINGS

These and other features, aspects, and advantages of the embodiments will become better understood when the following detailed description is read with reference to the accompanying drawings in which like characters represent like parts throughout the drawings, wherein.

DETAILED DESCRIPTION

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

Figure 1:
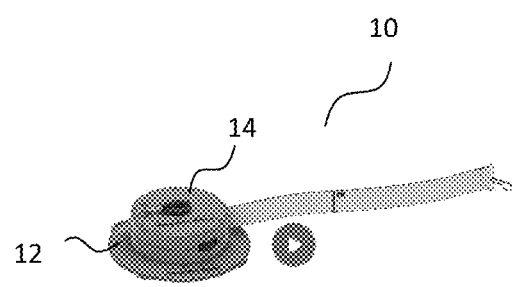
FIG. 1 shows a tape dispenser according to an embodiment.

As noted herein, a tape dispenser is provided. FIG. 1 shows the tape dispenser 10. The tape dispenser 10 includes a gripper pad 12 and a tape reel 14.

Figure 2:
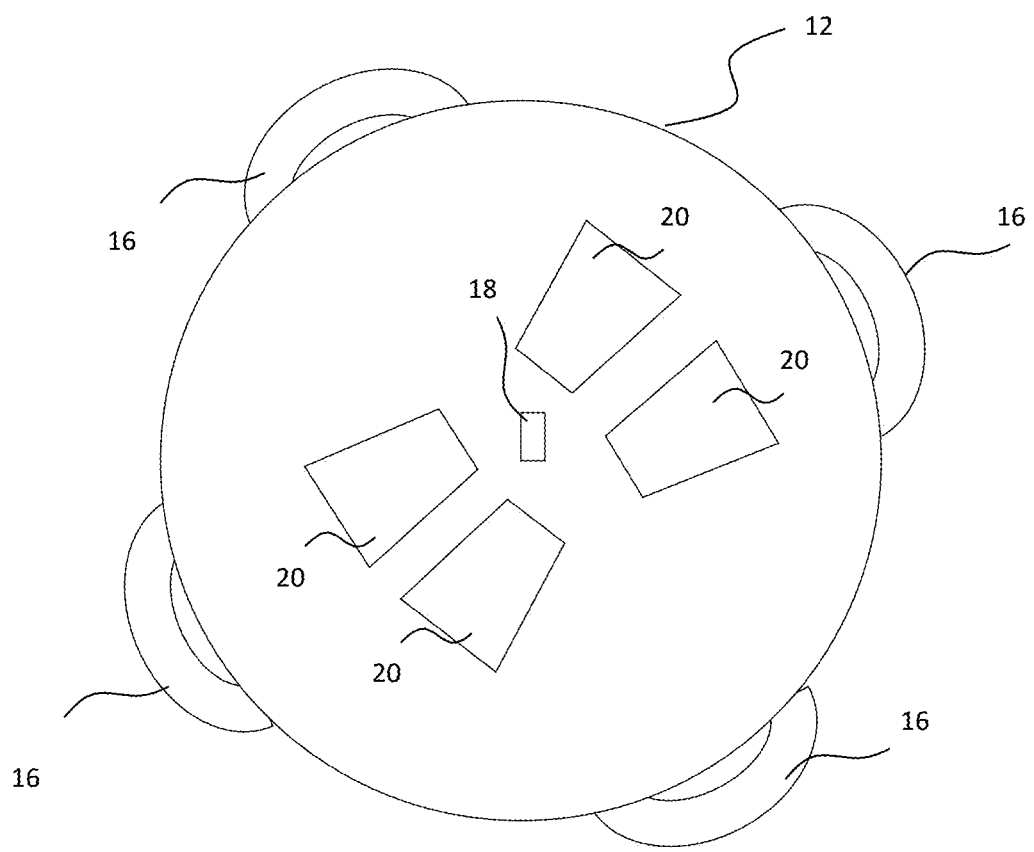
FIG. 2 is an exploded view of the gripper pad according to an embodiment.

FIG. 2 is an exploded view of the gripper pad 12, which is defined by a top part and a lower part. The lower part is configured to be placed on any surface, such as a floor, a lawn, and the like. The lower part includes at least one means for suction grip 16. Gripper pad 12 is dome-shaped to create a suction effect once weight is distributed on top. The top part of the gripping pad 12 includes a receptacle 18 for a connecting means. The gripping pad 12 also includes a means for receiving a stake 20. The stake will ensure that the gripper pad 12 will remain firmly affixed especially on uneven surfaces such as lawns and turfs.

Figure 3A:
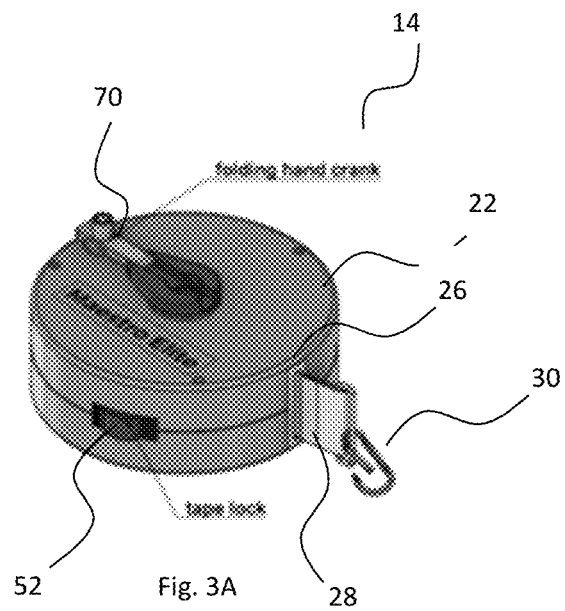
FIG. 3A is an isometric top view of the tape reel according to an embodiment.
Figure 3B:
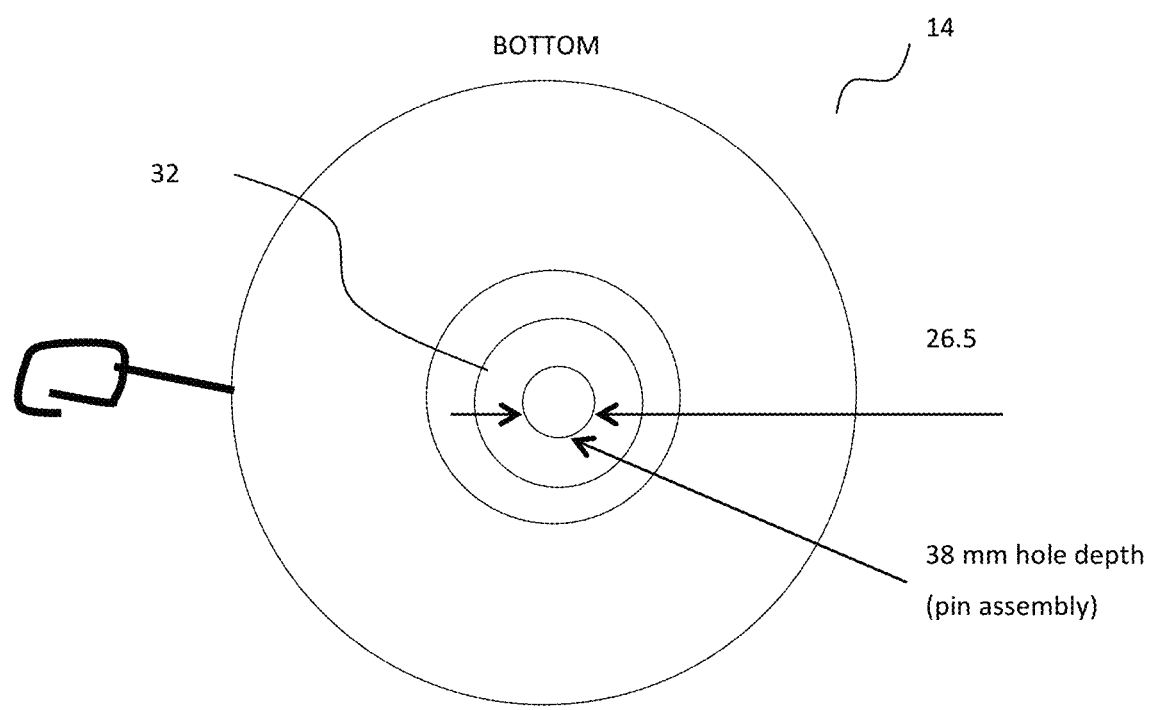
FIG. 3B is a view of the bottom of the tape reel according to an embodiment.
Figure 4:
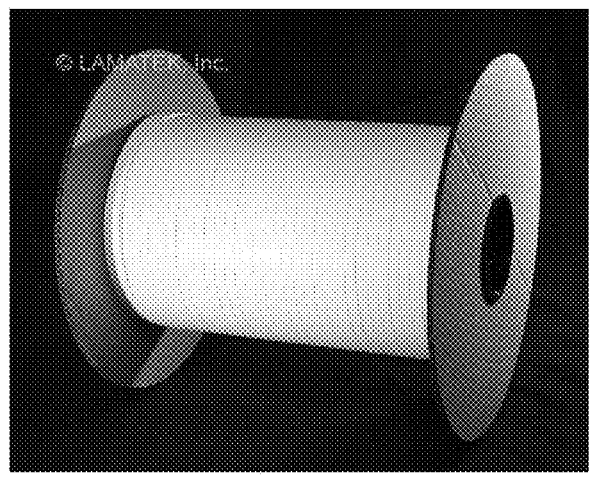
FIG. 4 is a spool on its side useful in the tape dispenser according to an embodiment.

FIG. 3A is an isometric top view of the tape reel 14, while FIG. 3B is a view of the bottom of the tape reel. The tape reel 14 includes a housing 22 in FIG. 3A. Enclosed within the housing 22 is a spool 24, an exemplary spool 24 is shown in FIG. 4 as lying on its side. Typically, spool is a cylinder that is fixed on both ends to the housing 22 but is allowed to spin freely around an axis of rotation. A tape is wound the spool thus rendering it retractable, wherein one end of the tape is fixed to the spool 24 while the other end is free. The spool 24 is configured to spin in one direction that will allow the tape to be dispensed, while spinning in the opposite direction will allow the tape to be retracted. Spool 24 may also include spring-loaded mechanisms to enable it to be spun in the direction that retracts the tape.

Returning to FIG. 3A, the housing 22 includes an opening 26 through which the tape 28 is dispensed from. The free end of the tape 28 includes a fastener 30. The housing 22 also includes a receiving means (not shown) for the fastener 30. In the embodiment, the fasteners may include hooks (as shown in the figure). Other exemplary fastening mechanisms may also be used, and are envisioned to be encompassed within the scope of the embodiments.

The tape 28 can be made of any material useful for this purpose, and may include, for example, but not limited to, canvas, nylon, cotton, plastic backed fiber, and the like. The tape 28 can also include measurement units printed on it to enable setting up perimeters with precise measurements. The units for measurement may include various systems of distance measurements, such as meters, centimeters, inches, feet, yards, and so on, and combinations thereof. In one embodiment, measurement units may be printed on both left and right hand side of the tape. Further, measurement units may be printed on the top and bottom sides of the tape. In this manner, different systems of measurements can be included that will allow for setting up perimeters with accurate measurements regardless of the measurement system in a simple, easy to read manner.

Additionally the tape dispenser 10 as described also allows for simple measurements between two points, wherein the first position is affixed without the requirement of a second person or any additional tools. In this manner, two positions can be marked using suitable means for a specific surface, such as a peg or a stake on a grass surface.

FIG. 3B is a view of the bottom of the tape reel, which includes a receptacle 32 for the connecting means.

The tape reel 14 also includes a tape lock 52 that will allow the spool to be locked in a certain position after the tape 28 has been extended to a desired length. Further, the tape reel 14 includes a folding hand crank 70 that enables retracting the tape into the housing.

Figure 5A:
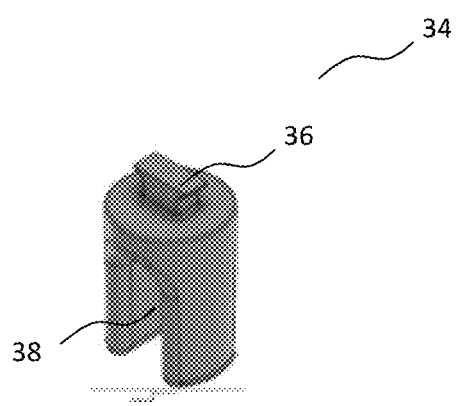
FIG. 5A is an isometric top view of the wedge connector according to an embodiment.
Figure 5B:
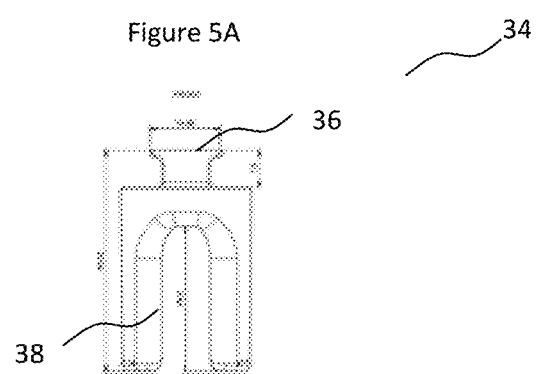
FIG. 5B is a side view of the wedge connector according to an embodiment.

The tape dispenser 10 than includes a connecting means FIG. 5 shows one exemplary connecting means 34 that is a wedge connector. FIG. 5A is an isometric top view of the wedge connector, according to an embodiment. The wedge connector 34 includes a top wedge 36 that is capable of being received by the receptacle 32 on the bottom of the reel. In an embodiment, the receptacle 32 can be designed in such a way that the top wedge portion 36 can be inserted in a certain direction only, and once inside, it can then be twisted or rotated thus ensuring wont slip out. This creates a swivel effect that allows the ability to measure in different directions from a particular soot without moving the base. The wedge connector 34 also includes a bottom wedge 38 that can be inserted into the receptacle 18 on the gripper pad. In this manner, the gripper pad and the tape reel are firmly connected to each other. FIG. 5B is a side view of the wedge connector.

Figure 6:
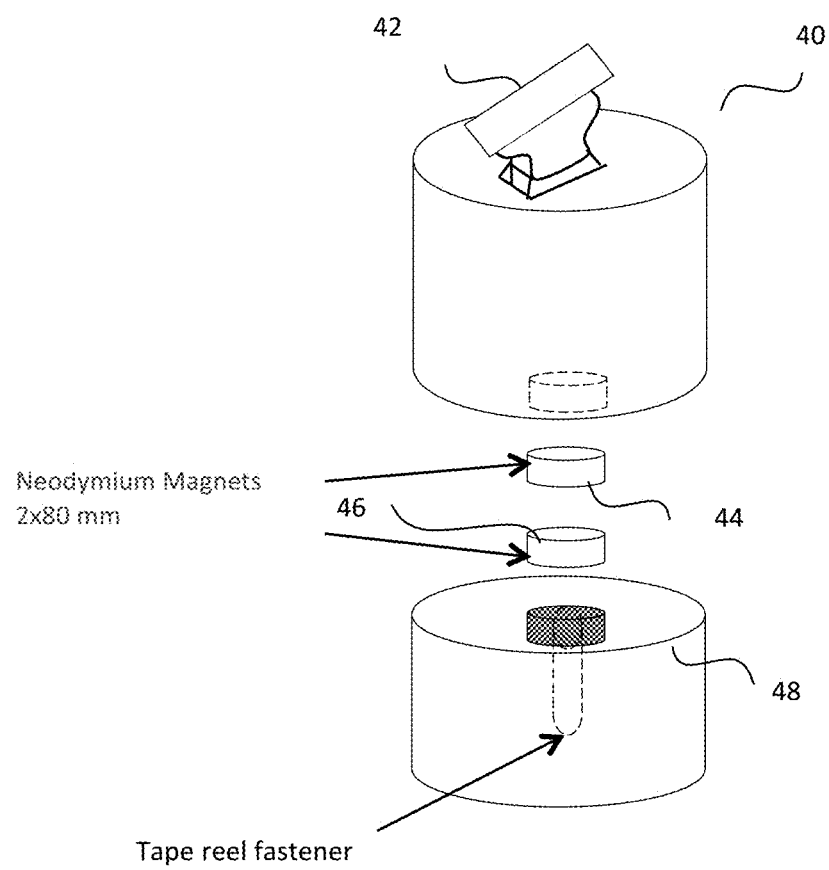
FIG. 6 is an exploded view of a magnetic connector according to an embodiment.

FIG. 6 is an exploded view of a magnetic connector 40, according to an embodiment. The magnetic connector 40 includes a top wedge like connector 42 with a receptacle for a magnet 44, and a bottom wedge like connector 46 with a receptacle for a magnet 48, wherein the top and bottom magnets have opposite polarities facing each other to enable strong attraction between them. The wedge connectors may be of similar configuration as described herein to ensure the connecting means are held in place with the gripping pad 12 and the tape reel 14.

Other means of connecting and locking the connecting means may be envisioned to be encompassed within the scope of the embodiments.

Thus, the tape dispenser 10 is capable of being affixed on any surface from which the tape can be dispensed, and the tape can be fastened onto a suitable fastening means on the other end. Once the gripper pad is connected with the tape reel, it can be placed on any type of surface and it will not move once tape is disbursed. Once the situation that required the tape dispenser has been dispensed with (e.g., the conclusion of a sporting activity or completion of a construction project), the tape can be retracted and the tape dispenser 10 can be stored away for future use without taking too much space. The tape dispenser 10 is also configured such that the tape reel 14 can freely rotate to allow the tape 28 to be extended in any direction without affecting the gripper pad 12 of the tape dispenser 10. One way of achieving proper fixation of the gripper pad 12 is by shaping it like a dome to create a suction effect once weight is distributed on top. Once the gripper pad 12 is connected with the tape reel, it can be placed on any type of surface and it will not move once tape is disbursed. The tape lock 52 can also be configured to lock the tape reel 14 to not spin anymore in its locked position, thus ensuring the tape does not extend any further from the tape reel.

In another embodiment, an apparatus for setting up a perimeter is provided. The apparatus includes a plurality of tape dispensers 10. The following exemplary embodiment is described using a 4-sided rectangle that is defined using a plurality of tape dispensers 10. But one skilled in the art will understand that any kind of geometric shape can be defined using an appropriate number of tape dispensers 10 to make the shape.

Figure 7:
FIG. 7 is a perimeter set up using a plurality of tape dispensers according to an embodiment.

FIG. 7 shows a perimeter defined by 4 different tape dispensers 10. First the 4 tape dispensers 54, 56, 58 and 60 are affixed on a suitable surface such as a turf to define the 4 corners of the rectangle. Then, the tape is extended from the tape reel of one tape dispenser and fastened onto the fastener receptacle of the second tape dispenser. Alternately, the first tape dispenser 54 is affixed on a suitable surface, and then the tape is extended along a desired direction until the predetermined distance has been covered, at which point the second tape dispenser 56 is affixed. The fastener receptacle is configured to be 90 degrees from the extending tape that allows for making a rectangle shape. The tape from second tape dispenser is similarly extended and fastened to the third tape dispenser, and the third tape dispenser is fastened to the fourth tape dispenser. In the alternate embodiment described herein, the tape is extended from the second tape dispenser along the desired direction to the desired length at which point the third tape dispenser is affixed. Finally, the fourth tape dispenser is fastened to the first tape dispenser thus forming a rectangular perimeter.

For perimeters having other shapes and dimensions, the angle between the fastener receptacle and the tape is adjusted accordingly.

In some embodiments, the tape dispenser 10 may be used to measure distances between any two given points at any given angle without any limitations and create any geometric shape as required. Further, any kind of marker such as a peg or stake can be used to mark positions with or without the tape in place. The extension of the tape to demarcate boundaries and perimeters is an option, and in many instances, just marking the edges of boundaries based on accurate measurement without the use of the tape is in itself a requirement.

Figure 8:
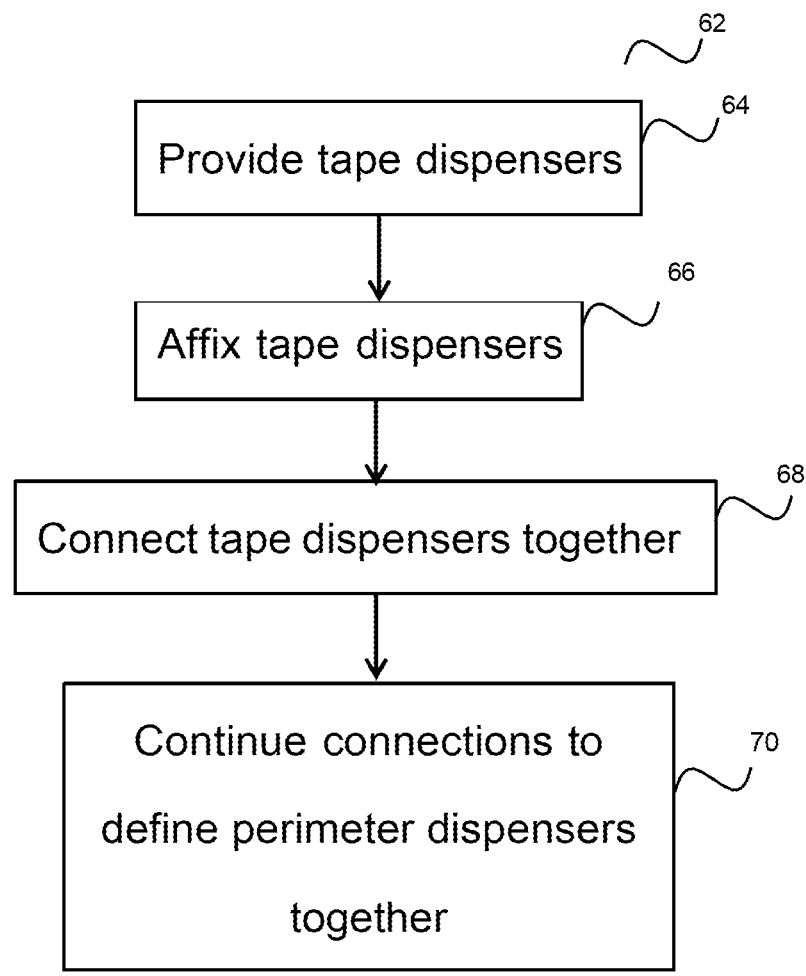
FIG. 8 is a flow chart representation of the method steps according to an embodiment.

In another embodiment, a method for setting up a perimeter is provided. FIG. 8 is a flowchart representation of the steps involved in the method, generally depicted by numeral 62. In step 64, the method includes providing a plurality of tape dispensers 10. Then the method involves affixing a predetermined number of tape dispensers at predefined positions that define corners of the perimeter, shown in step 66. Subsequently, the method includes the step of connecting two tape dispensers by extending the tape from the first tape dispenser and fastening it to the second tape dispenser to define one side as seen in step 68. Then, step 70 includes repeating the connecting of plurality of tape dispensers to each other to define all the sides of the perimeter.

The tape dispenser, the apparatus and the method of the embodiments enable simplicity in setting up of perimeter in a rapid and accurate manner by provide tape dispenser that can dispense tape having distance measurements, and a built-in means for fastening the extended tape. For example, the embodiments enable rapid and facile setting up of a standard volleyball court that has a standard playing court dimensions of 18 m long and 9 m wide, or a beach volleyball court whose dimensions are 16 m long and 8 m wide. Some playing arenas such as a football field are defined by yards, and the tape may be configured to also include measurements in those units. Another unique advantage offered by the tape dispenser of the embodiments is that the perimeter can be expanded or reduced based on requirement without too much effort. For example, a perimeter can be set up for a pick-up soccer game that involves 11 players in a side, which would require a larger laying area. However, if the number of players who actually show up are lesser, then the tape dispensers can be appropriately shifted to demarcate a smaller area, say for a 5-a-side soccer game instead. The tape dispensers of the embodiments enable this transformation within a matter of seconds by providing all the requisite tools within the tape dispensers. This puts greater emphasis on the activity per se such as the sports activity rather than making the setting up of the perimeter a time consuming and labor-intensive activity by itself.

Other use case scenarios of the tape dispenser 10 of the embodiments include setting up running routes for wide receivers and running backs in football. Establishing running routes in football is one example of a situation wherein the tape dispenser of the embodiments is used to measure distances accurately by affixing one end and marking the first and second spot with suitable markers such as a peg or a stake but doesn't require the tape to be extended between the two spots. Further, end zones in football can be accurately mapped out using the in-built tape measure that can provide exact measurement on any surface like grass and/or track.

That is, with the tape dispenser 10 as described, connecting to other cones is unnecessary to create a measured perimeter. For example, on grass, one can use a single tape dispenser 10 to measure a distance in a straight line, then a grass stake or peg can hold the tape on the ground, while the tape reel 14 can be pivoted and continue measurement into another direction to make a variety of shapes without the need to use cones as placeholders.

Thus, the may allow for accurate measurement of distances between two points in any direction, while affixing one position at a certain location without the requirement of a second person or any other additional tool. The embodiments also may allow for flexibility in setting up the perimeter as required for any situation like a sporting activity.

While only certain features of the embodiments have been illustrated and described herein, many modifications and changes will occur to those skilled in the art. It is, therefore, to be understood that the appended claims are intended to cover all such modifications and changes as fall within the true spirit of the embodiments.

What is claimed is:
1. A tape dispenser comprising:
 a gripper pad, the gripper pad having:
  one or more suction grip on one side of the gripper pad;

a receptacle located at a center of the gripper pad on another of the gripper pad opposite the one side; and a plurality of stake receivers protruding through the gripper pad and surrounding the receptacle;

a tape reel having:
a spool;
a tape comprising a fixed end and a free end, wherein the tape is wound around the spool and fixed to the spool at the fixed end;
a fastener on the free end of the tape;
a housing that encloses the spool and the tape, wherein the housing comprises an opening through which the tape is dispensed; and
a tape look configured to look the spool in a predetermined position, upon the tape being extended to a predetermined length; and a tape connector configured to connect the gripper pad and the tape reel.

2. The taps dispenser of claim 1 wherein:
the tape reel further comprises a receptacle located at a center of the tape reel on a bottom side of the tape reel, and
the tape connector is a wedge connector having a top wedge operatively connected to the receptacle of the tape reel on a first end of the to connector.

3. The tape dispenser of claim 2 wherein the wedge connector further has a bottom wedge operatively connected to the receptacle of the gripper pad on a second end of the tape connector opposite the first end of the tape connector.

4. The tape connector of claim 3 wherein the top wedge is operatively connected to the receptacle of the tape reel by insertion in a singular direction into the receptacle of the tape reel, and rotation of the top wedge relative to the receptacle or the tape reel after the insertion.

5. The tape dispenser of claim 1 wherein the fastener is a hook.

6. The tape dispenser of claim 1 wherein the tape comprises tape measurements printed on the tape.

7. An apparatus for setting up a perimeter comprising a plurality of the tape dispenser of claim 1.

8. An apparatus for setting up a perimeter comprising:
a plurality of tape dispensers; wherein each tape dispenser comprising:
a gripper pad, the gripper pad having:
one or more suction grip on one side of the gripper pad;
a receptacle located at a center of the gripper pad on another side of the gripper pad opposite the one side; and
a plurality of stake receivers protruding through the gripper pad and surrounding the receptacle;
a tape reel having:
a spool;
a tape comprising a fixed end and a free end, wherein the tape is wound around the spool and fixed to the spool at the fixed end;
a fastener an the free end of the tape;
a housing that encloses the spool and the tape, wherein the housing comprises an opening through which the tape is dispensed; and
a tape lock configured to lock the spool in a predetermined position, upon the tape being extended to a predetermined length; and
a tape connector configured to connect the gripper pad and tape reel.

9. The tape dispenser of claim 8 wherein the tape connector is a magnetic connector having:
a receptacle located within the magnetic connector, and
a magnet placed within the receptacle of the magnetic connector.

10. The tape dispenser of claim 9 wherein:
the magnetic connector further has top connector and a bottom connector, and
the receptacle located within the magnetic connector includes a top receptacle located within the top connector, and a bottom receptacle located within the bottom connector.

11. In tape connector of claim 10 wherein:
the magnet placed within the magnetic connector includes a top magnet placed within the top receptacle, and a bottom magnet placed within the bottom receptacle, and
the top magnet and the bottom magnet having opposite polarities facing each other.

12. The tape dispenser of claim 8 wherein the fastener is a hook.

13. The tape dispenser of claim 8 wherein the tape comprises measurement units printed on the tape.

14. A method for setting up perimeter, the method comprising:
providing a plurality of tape dispensers, wherein each tape dispense comprises:
a gripper pad, the gripper pad having:
one or more suction grip on one side of the gripper pad;
a receptacle located at a center of the gripper pad on another side of the gripper pad opposite the one side; and
a plurality of stake receivers protruding through the gripper pad and surrounding the receptacle;
a tape reel having:
a spool;
a tape comprising a fixed end and a free end, wherein the tape is wound around the spool and fixed to the spool at the fixed end;
a fastener on the free end of the tape;
a housing that encloses the spool and the tape, wherein the housing comprises an opening through which the tape is dispensed; and
a tape lock configured to lock the spool in a predetermined position upon the tape being extended to a predetermined length; and
a connector configured to connect the gripper pad and the tape reel;
affixing a predetermined number of tape dispensers at predefined positions that define corners of the perimeter;
connecting two tape dispensers by extending the tape from a first tape dispenser and fastening it to a second tape dispenser to define one side; and
repeating the connecting of the two tape dispensers to each other to define all sides of the perimeter.

15. The method of claim 14 wherein;
the tape reel further comprises a receptacle located at a center of the tape reel on a bottom side of the tape reel, and
the connector a wedge connector having a top wedge operatively connected to the receptacle of the tape reel on a first end of the connector.

16. The method of claim 15 wherein the wedge connector further has a bottom wedge operatively connected to the receptacle of the gripper pad on a second end of the connector opposite the first end of the connector.

17. The method of claim 16 wherein the top wedge is operatively connected to the receptacle of the tape reel by insertion in a singular direction into the receptacle of the tape reel, and rotation of the top wedge relative to the receptacle of the tape real after the insertion.

18. The method of claim 14 wherein the fastener is a hook.

19. The method for setting up a perimeter of claim 14 wherein the tape further comprises measurement units printed on the tape.

* * * * *